United States Patent [19]

Boyer

[11] 3,928,507

[45] Dec. 23, 1975

[54] SUBSTITUTED NORBORNENE COMPOUNDS AND THEIR APPLICATIONS IN THERMOPLASTIC POLYMER COMPOSITIONS

[75] Inventor: Nicodemus E. Boyer, Parkersburg, W. Va.

[73] Assignee: Borg-Warner Corporation, Chicago, Ill.

[22] Filed: June 15, 1973

[21] Appl. No.: 370,266

Related U.S. Application Data

[60] Division of Ser. No. 248,773, April 28, 1972, Pat. No. 3,784,581, which is a continuation of Ser. No. 824,668, May 14, 1969, abandoned.

[52] U.S. Cl............ 260/940; 260/45.9 R; 260/454; 260/464
[51] Int. Cl.². .................. C07F 9/02; C07C 121/48
[58] Field of Search............................ 260/464, 940

[56] References Cited
UNITED STATES PATENTS

| | | | |
|---|---|---|---|
| 2,900,377 | 8/1959 | Fields.................................. | 260/139 |
| 2,967,842 | 1/1961 | Roberts............................. | 260/33.8 |
| 3,052,649 | 9/1962 | Oita et al.......................... | 260/45.5 |
| 3,201,484 | 8/1965 | Myers et al....................... | 260/666 |
| 3,489,814 | 1/1970 | Pews et al........................ | 260/464 X |
| 3,492,330 | 1/1970 | Trecker et al................... | 260/464 X |
| 3,515,740 | 6/1970 | Frampton .......................... | 260/464 |
| 3,758,646 | 9/1973 | Boyer.............................. | 260/940 X |
| 3,784,581 | 1/1974 | Boyer.............................. | 260/464 |

OTHER PUBLICATIONS

Prill, J.A.C.S., 69 (1947), pp. 62–63.

*Primary Examiner*—Joseph P. Brust
*Attorney, Agent, or Firm*—Richard J. Schlott

[57] ABSTRACT

Compositions of matter having the following structural formula:

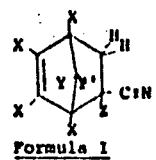

Formula I wherein each X is selected from the group chlorine, fluorine and bromine; Y and Y' are each selected from the group consisting of hydrogen, halogen and lower (1–4C) alkyl, alkoxy and halogen-substituted alkyl and alkoxy radicals; and Z is selected from the group consisting of halogen, (1–4C) alkyl, (1–4C) alkoxy; nitrile, thiocyanate, isocyanate, isothiocyanate and phosphono groups of the formula:

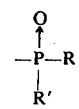

wherein R and R' are each selected from the group consisting of lower (1–4C) alkyl, alkenyl, substituted alkyl, alkoxy, alkenoxy and substituted alkoxy groups.

The compositions of Formula I above are halogen and phosphorus derivatives of cyanonorbornene. These compositions are additives in thermoplastic compositions and lend flame retardant characteristics thereto. The compositions may be prepared by reacting equimolar amounts of substituted acrylonitrile of the formula:

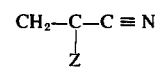

wherein Z is defined as in Formula I with halogenated cyclopentadiene of the formula:

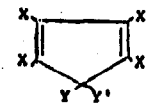

Formula III wherein each X is chlorine, fluorine or bromine and Y and Y' are each selected from the group consisting of hydrogen; halogen, preferably chlorine, bromine or fluorine; lower (1–4C) alkyl, alkoxy and halogen-substituted alkyl and alkoxy radicals.

3 Claims, No Drawings

SUBSTITUTED NORBORNENE COMPOUNDS AND THEIR APPLICATIONS IN THERMOPLASTIC POLYMER COMPOSITIONS

This application is a division of application Ser. No. 248, 773, filed Apr. 28, 1972, now U.S. Pat. No. 3,784,581, which was a continuation of application Ser. No. 824,668, filed May 14, 1969, now abandoned.

BACKGROUND AND SUMMARY OF THE INVENTION

This invention is directed to novel compositions of matter, which are generically referred to as halogen and phosphorus derivatives of cyanonorborene, and a method of providing flame retardant thermoplastic polymeric materials through the incorporation of varying amounts of cyanonorborene components into thermoplastic polymeric materials. the cyanonorborene compositions are novel per re and have additionally been found to have extraordinarily useful properties as flame retardant additives in thermoplastic polymeric materials.

In order for a thermoplastic polymer to utilize flame retardant components or additives, the resin must not be adversely affected by the additive. The flame retardant additive should also provide the thermoplastic polymeric composition with self-extinguishing characteristics after contact with open flame in accordance with the ASTM flammability test designated ASTM D635-63.

A flame retardant additive to be useful must be thermally stable and should have stability that is comparable to the stability of the thermoplastic polymer to which it is added. For example, if the additive is blended with an acrylonitrile-butadiene-styrene graft polymer (ABS resin) it should not decompose or discolor (become unstable) at injection-molding temperatures of up to 470°F.

The additive also must not sublime from the mixture when the polymeric material is heated, nor should it be corrosive to the apparatus that is working the mixture at elevated working temperatures. The additive component must also be compatible with the thermoplastic materials and remain soluble in the thermoplastic during milling and molding thereof. The additive desirably should improve the flow of the thermoplastic and if the melting point of the additive is too high, it generally imparts poor flow characteristics to the thermoplastic material.

One of the most important aspects of a flame retardant additive is that it not adversely affect the physical properties of the thermoplastic material to which it is added, i.e., does not undesirably affect the impact strength, flexural strength, flow characteristics, modulus, etc.

The flame retardant compositions of this invention are extraordinarily useful additives for thermoplastic materials such as acrylonitrile-styrene-butadiene polymers, polyurethane, polyethylene, polypropylene, acrylate polymers such as poly(methyl methacrylate), poly(vinyl chloride), polyisoprene, polystyrene, linear polybutadiene, cross-linked polybutadiene, polyisobutylenes, polyamides, poly(styrene-acrylonitrile), ethylene-propylene rubber, ethylene-propylene copolymers, acrylic polymers, polycarbonates, polysulfonates, polysulfones, polyphenylene oxide as well as copolymers, graft polymers, mixtures thereof and the like. The additive composition of this invention are stable at the normal processing temperatures of the aforementioned polymeric materials and do not discolor the polymers or have an adverse effect on the flow characteristics thereof. It has also been found that the flame retardant additives of this invention are also very compatible with the aforementioned thermoplastic materials and do not sublime or decompose at the processing temperatures thereof. The use of the compositions of this invention as flame retardant additives has been found extraordinarily economical and the compounds do in fact improve on the flow characteristics and physical properties of the thermoplastic to which they are added. Other advantages will be understood from a reading of the description of the invention hereinbelow.

In general, the compositions of this invention have the general formula:

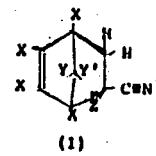

(I)

wherein each X is preferably selected from the group consisting of chlorine, fluorine and bromine and Y and Y' are each selected from the group consisting of hydrogen, halogen and lower (1–4C) alkyl and alkoxy, and Z is selected from the group consisting of halogen, (1–4C) alkyl, (1–4C) alkoxy, nitrile, thiocyanate, isocyanate, isothiocyanate and phospheno groups of the formula:

wherein R and R' are selected from the group consisting of lower (1–4C) alkyl, alkenyl, substituted alkyl, alkoxy, alkenoxy and substituted alkoxy groups.

The compositions of this invention are preferably obtained from the Diels-Alder reaction of one mole of substituted acrylonitrile of the formula:

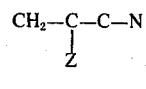

(II)

wherein Z is defined as in the general formula of the composition reacted with one mole of halogenated cyclopentadiene of the formula:

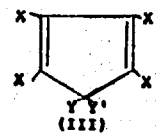

(III)

wherein each X is selected from the group consisting of chlorine, fluorine and bromine and Y and Y' are each selected from the group consisting of hydrogen, halogen, lower (1–4C) alkyl, alkoxy, and halogen-substituted alkyl and alkoxy radicals.

An example of the compositions of this invention is that provided by the Diels-Alder reaction of α-chloroacrylonitrile with hexachlorocyclopentadiene.

There have been a great many fire retardant compositions provided for use as additives in thermoplastics and many of these additives have utilized chlorine or bromine substituents to aid the flame retardant character of the thermoplastic. See for example the article by H. E. Ungnado and E. T. McBee. "The Chemistry of Perchlorocyclopentenes and Cyclopentadienes", Chemical Reviews 58(2), 249–320 (1958). This article refers to a great number of Diels-Alder adducts prepared by the reaction of halogenated cyclopentenes and cyclopentadienes with various dienophiles. There is, however, no reference in the article to any class of Diels-Alder adducts prepared from halogenated cyclopentadiene reacted with the halogen-substituted acrylonitriles or the otherwise substituted acrylonitriles of this invention.

U.S. Pat. No. 3,392,136 describes a flame retardant for polymeric compositions having the general formula:

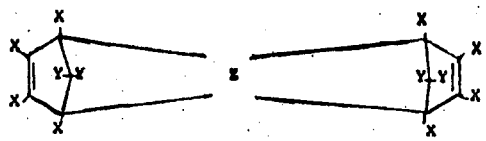

wherein X is bromine, chlorine or fluorine; Y is bromine, fluorine, chlorine, alkyl or alkoxy radicals; and Z is a tetravalent cyclic hydrocarbon radical containing at least five carbon atoms.

There have been a great many Diels-Alder adducts prepared for a variety of end uses; see for examples U.S. Pat. Nos. 3,052,649; 3,201,484; 2,967,842 and 2,900,377. These compounds have not all served as thermoplastic polymer additives nor have they been compatible with that variety of thermoplastics required for a versatile flame retardant additive.

The instant invention has greater utility than the aforementioned compositions in view of its extraordinary compatibility with resins, fire retardance and stability. The substituted acrylonitrile adduct of a hexahalocyclopentadiene (or other substituted cyclopentadienes defined in Formula III) has surprising stability to heat because of the norbornene ring which makes it comparable to the stability of an aromatic ring. The six halogen atoms of the compound are chemically more stable than they are in the cyclopentadiene and yet more effective for fire retardant action than halogen atoms would be if they were on an aromatic compound. The cyano group is important since it facilitiates the ease of preparation of the compound, i.e., the conjugation of the cyano triple bond with the carbon to carbon double bond in α-substituted acrylonitrile makes the acrylonitrile more reactive than unconjugated olefinic compounds. The cyano group also aids the compound in its compatibility with the acrylonitrile-butadiene-styrene graft polymers and interpolymers as well as with a variety of other thermoplastics. It should be noted that many of the compositions such as acrylonitrile-styrene copolymers and the aforementioned acrylonitrile-styrene-butadiene graft polymers contain cyano groups which tends to explain the compatibility of the compositions of this invention with those specific thermoplastic polymeric materials. The presence of a cyano group on a norbornene group is also important for electron withdrawal to facilitate the compatibility with a variety of other polymers through increased polarity of the compound. Thus, the carbonyl and carbon-nitrogen polarity of polyesters, polyurethane, polyamides, polyureas, etc. corresponds to or is somewhat similar to the polarity caused by the chlorine and the cyano group in the additives of the instant invention.

In addition to the cyano group, the functional group Z in Formula I is important for high compatibility and fire retardance. Irrespective of whether Z is a halogen or a phosphono group, it will have extremely high fire retardant effect. If Z is halogen in Formula I, it is more reactive than the halogens in the X, Y and Y' positions and will be released at a lower temperature when subjected to a flame or other source of heat. The halogens at X, Y and Y' being released at higher temperatures will protect the deeper layers of thermoplastic polymers from burning. Many of the fire retardant compositions in the prior art require 8 to 10% of antimony oxide to provide fire retardant characteristics along with 20+% of the fire retardant additive. The fire retardant additives of the instant invention are effective utilizing approximately 15% without necessarily requiring any antimony oxide additives to contribute to the fire retardant effects. Antimony oxide may be added in amounts of up to 10% by weight if desired, to aid in the flame retardance of the composition.

If Z is a phosphono group in Formula I, higher fire retardant and self-extinguishing properties will be obtained in the range of 10–30% of the composition and it will not be necessary to add any anitmony oxide. The preferred compositions of this invention are those wherein Z is either chlorine, bromine or a phosphono group. If Z is an isocyanate group (—NCO) the product of the Formula I is more reactive with resins. Isocyanate derivatives react with polyols to form a urethane linkage, which is useful for synthesis of fire retardant polyurethane foams.

The compositions as briefly mentioned above are normally prepared by the addition reaction of substituted cyclopentadiene with α-substituted acrylonitrile. The reaction may also occur by the exchange of 2-halo substituents on adducts of α-halo-acrylonitrile and substituted cyclopentadiene.

The substituted cyclopentadiene is reacted with an α-substituted acrylonitrile at 70°–180°C for a period of 30 minutes to 30 hours, depending on the nature of the substituents. The reaction may be accelerated by the addition of a Friedel-Crafts catalyst. Normally no solvents are required; however, it is often convenient to employ inert organic solvents to lend the proper mixing viscosity.

The halogen atom in the 2-position (Z) may be exchanged for an alkoxy group by dissolving the adduct in an appropriate alcohol (i.e., an alcohol containing the desired alkoxy group) in the presence of an alkali or alkaline earth base at temperatures of from 0°–100°C. The by-product alkali halide or alkaline earth halide salt is filtered off and the remaining product is distilled to separate the compound. In exchanging the 2-halogen for a phosphono group, the adduct is reacted with a trivalent phosphorus compound such as a phosphite ester, phosphonite ester, or a phosphinite ester at 25°–150°C with or without a suitable solvent (depending on the desired viscosity). The product is also recovered in this instance by separating it from the alkyl halide or alkenyl halide by distillation. The 2-halogen may also be exchanged for a nitrile, thiocyanate, isocyanate or isothiocyanate group such as defined for (Z) in Formula I above, by dissolving the adduct in a suitable solvent, for example a ketone, in the presence of an alkali, alkaline earth, or silver salt of the specific cyanide, thiocyanate, etc., and reacting with the composition at 25°–150°C. The by-product halide salt of silver, alkali or alkaline earth is filtered off and the product is recovered by fractional distillation or by crystallization from the residue if the porduct is a solid.

To further illustrate the preparation, several examples are set forth hereinbelow. It will be understood that the examples are for the purpose of illustration and are not meant to in any way limit the invention nor to restrict the invention to specific recipes and/or conditions.

EXAMPLE I

Synthesis of 2-Cyano-1,2,4,5,6,7,7-Heptachloro-5-Norbornene

The preferred composition is a flame retardant additive referred to as 2-cyano-1,2,4,5,6,7,7-heptachloro-5-norbornene ("HEPT") prepared from hexachlorocyclopentadiene reacted with α-chloroacrylonitrile in a 1:1 molar ratio as set forth below:

2,976 parts by weight of α-chloroacrylonitrile and 9,008 parts by weight of hexachlorocyclopentadiene were placed in a reactor in the presence of six parts by weight aluminum chloride and four parts by weight dibutyltin dimaloate at room temperature. The mixture was heated to 95°–109°C for 10 hours and thereafter to 122°–133°C for 45 minutes under a nitrogen atmosphere. The products obtained were separated by filtration. The solid obtained by filtration was dissolved in chloroform and acetone and precipitated in ether. The product was reprecipitated from n-heptane until it crystallized in the form of white crystals having a melting point of 178°–180°C. The yield was 9801 parts by weight or 83%. The composition was analyzed and found to have the structural formula as follows:

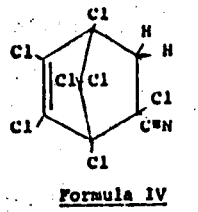

or $C_8H_2Cl_7N$ ("HEPT")

Formula IV

The "HEPT" compound set forth above is most efficiently prepared in large quantities (on a commercial scale) by the gradual addition of α-chloroacrylonitrile to preheated hexachlorocyclepentadiene.

The product designated as "HEPT", white crystals sp 178°–180° C, was correctly analyzed as follows, and its structure was confirmed by the NMR and IR spectra.

Anal. Calcd. for "HEPT" or $C_8H_2Cl_7N$: C, 26.66%; H, 0.56%; N, 3,89%; Cl, 68.89%; Molecular weight, 360.3. Found: C, 26.51; 26.46; average C, 26.50%; H, 0.52; 0.70; average H, 0.61%; N, 3.43; 3.40; average N, 3.42%; Cl, 69.42; 69.20; average Cl, 69.31%; Molecular weight (determined in benzene solution): 359; 349; average, 354.

EXAMPLE II

Sythesis of 2-Bromo-1,4,5,6,7,7-Hexachloro-2-Cyano-5-Norbornene

Systhesis of 2-bromo-1,4,5,6,7,7-hexachloro-2-cyano-5-norbornene was accomplished by reaction of hexachlorocyclopentadiene reacted with α-bromoacrylonitrile in a 1:1 molar ratio.

1,091.2 parts by weight of hexachlorocyclopentadiene and 528 parts by weight of α-bromoacrylonitrile were placed in a reactor with three parts by weight of aluminum chloride and two parts by weight of dibutyltin dimaleate. The components were mixed at room temperature and heated with stirring under nitrogen notrogen atmosphere to 100°–110° C for five hours. The composition was thereafter heated to 120°–125° C for 2.5 hours and to 130°–155° C for an additional 5 hours. The theoretical yield of the brominecontaining norbornene adduct was 1619.2 parts by weight. After the reaction was completed, the solid was filtered and washed with 1050 parts by weight of chloroform. The principal reaction product was soluble in chloroform. The product was concentrated by distillation of chloroform and was recrystallized to yield 1493 parts by weight or 92.3% yield of the product. The product was analyzed and found to have the structural formula as follows:

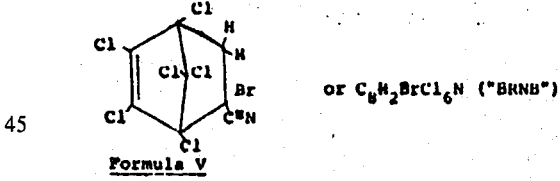

Formula V

This compound is referred to herein as "BRNB." The recrystallized and dried product BRNB formed white crystals having a melting point of 172°–178°C. Also, the order of addition of reactants can be changed if desired.

The analysis of the product is set forth in the table below:

| ANALYSIS % Elements | %C | %H | %N | %Cl | %Br | Mol. Wt. |
|---|---|---|---|---|---|---|
| Calcd. for "BRNB" | 23.73 | 0.53 | 3.46 | 52.53 | 19.75 | 404.74 |
| Found, 1. detn. | 23.76 | 0.57 | 3.42 | 52.20 | 19.54 | 385 |
| Found, 2. detn. | 23.90 | 0.58 | 3.46 | 52.35 | 19.40 | 391 |
| Found, average | 23.83 | 0.57 | 3.44 | 52.28 | 19.47 | 388 |

The infrared spectrum of this product showed the presence of characteristic absorption bands expected for the structure of "BRNB."

It will be understood by those skilled in the art that solvents such as xylene may be used to alter the viscosity of the mixture.

The BRNB product was a very effective fire retardant additive when added to polyurethane foams, polyethylene, polypropylene, acrylonitrile-styrene-butadiene (ABS) graft polymer and copolymer resins and in other thermoplastic polymeric materials.

BRNB is recommended as a flame retardant additive in those resins which do not require extremely high temperature stability in melting and molding processes. For those resins, i.e., thermoplastic polymer materials which require high molding temperatures, other products of this invention are better suited because the bromine atom is somewhat less stable than the chlorine atom on the norbornene structure. Bromine does, however, contribute excellent flame retardance.

EXAMPLE III

Synthesis of 2-Ethoxy-1,4,5,6,7,7-Hexachloro-2-Cyano-5-Norbornene

An ethoxy substituted norbornene compound hereinafter referred to as "ENB" was synthesized from 2-cyano-1,2,4,5,6,7,7-heptachloro-5-norbornene ("HEPT") reacted with ethanol and potassium hydroxide with replacement of the chlorine in the activated 2-position by ethoxy.

78.5 parts by weight of anhydrous ethyl alcohol containing 18 parts by weight of HEPT was added to a reactor along with 2.81 parts potassium hydroxide in 110 parts by weight of ethyl alcohol at 40°C. The pale yellow color of the HEPT solution changed to a deep purple upon addition of the reactants. A nearly white precipitate containing potassium chloride formed, and was collected and washed with 23.5 parts of ethanol. Ethanol was removed from the filtrate by distillation. The residue was a purple, somewhat viscous but pourable liquid. The yield of crude ENB was 100%. The ENB was purified by distillation at a pot temperature of 170°–175°C and a vapor temperature of 130°–133°C at 0.26–0.29 mm Hg. The distillate was analyzed and the analysis is set forth in the table below:

| % Elements | %C | %H | %N | Molecular Wt. |
|---|---|---|---|---|
| Calcd. for "ENB" or $C_{10}H_7NCl_6O$ | 32.49 | 1.91 | 3.79 | 369.92 |
| Found for sample, pale yellow liquid | 32.40 | 1.93 | 3.80 | 360 (in benzene) 363 (in CHCl$_3$) |

The structure of ENB is:

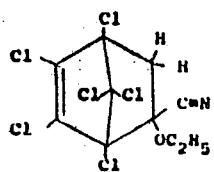

Formula VI

The product ENB was a very useful plasticizing fire retardant additive in a variety of polymers. In acrylonitrile-butadiene-styrene graft polymer and copolymer resins, it also acted as a mold release agent and contributed to fire retardance of plastics with about the same efficiency as HEPT. In amounts from about 5–20% by weight, ENB was also found to be useful as a fire retardant additive and plasticizer in poly(vinyl chloride)/acrylonitrile-butadiene-styrene graft polymer resin blends. The ENB contributed to the self-extinguishing properties of this resin blend and caused the normally brittle poly(vinyl chloride) resins to become soft and pliable.

ENB was also utilized as a vehicle in fire retardant paint wherein 20–80 parts by weight of ENB and 20–80 parts by weight of linseed oil, preferably 50/50 ENB/linseed oil, were used as a vehicle for pigment such as zinc oxide, titanium dioxide, ferric acetylacetonate, and various other white or colored pigments. Upon use of this paint on wood, cardboard, metals and other substrates, the coating exhibited fire retardant properties.

EXAMPLE IV

Preparation of 2-Dimethoxyphosphono-2-Cyano-1,4,5,6,7,7-Hexachloro-5-Norbornene 2-cyano-2-dimethoxyphosphono-1,4,5,6,7,7-hexachloro-5-norbornene was synthesized from 2-cyano-1,2,4,5,6,7,7-heptachloro-5-norbornene and trimethyl phosphite as follows:

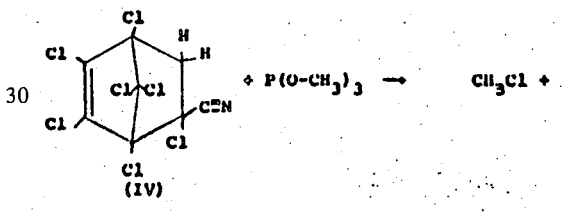

(IV)

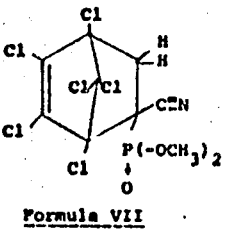

Formula VII

The compound of this example is hereinafter referred to as "CPNB." 900.8 parts by weight of "HEPT" ($C_8H_2Cl_7N$: was dissolved in 1035 parts by weight of xylene. The solution was charged to a flask equipped with a reflux condensor and was warmed to 67°C under a nitrogen atmosphere. A solution of 372.3 parts of trimethyl phosphite (TMP) and 430 parts of xylene was added to the HEPT solution dropwise with mechanical stirring. Methyl chloride evolved from the reaction solution and was eliminated through a vertical condenser. The addition of the trimethyl phosphate was complete after 2 hours and 50 minutes at 67° to 131°C. The heating was continued for an additional 7 hours at 100° to 133°C the next day.

The total xylene and a trace of excess unreacted trimethyl phosphite were removed by distillation at a reduced pressure. The principal product was distilled at 118.5°C/1 mm to 131.5°C/2.5 mm as a yellow liquid. The product was distilled by fractional distillation to yield a pale yellow liquid having a boiling point of 102° to 130°C/0.2 mm. The index of refraction was 1.5158 at 28°C with a density of 1.5554 at 25°C and the product was identified as CPNB.

Anal. Calcd. for "CPNB" or $C_{10}H_8Cl_6O_3NP$: C, 27.70%; H, 1.86%. Found: C, 27.61%; H, 1.74%.

In another synthesis, CPNB was prepared by the following reaction:

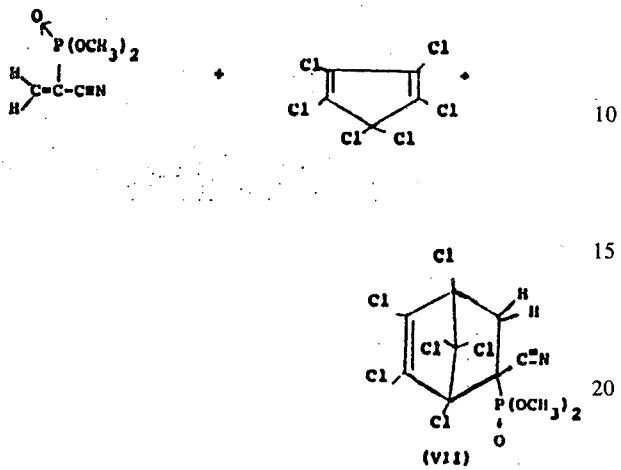

In this second preparation equimolar amounts of α-dimethoxyphosphonoacrylonitrile (α-DMPAN) and hexachlorocyclopentadiene were heated in the presence of 0.2% by weight of 2,6-di-tert-butyl-4-methylphenol for 4 hours at 180°C in nitrogen atmosphere and the resulting dark brown reaction mixture was distilled at a reduced pressure to obtain "CPNB" or $C_{10}H_8Cl_6O_3NP$ as the last distillation fraction. A sample of redistilled "CPNB" (a nearly colorless liquid, bp 112°C/0.65 mm to 110°C/0.40 mm) was analyzed as follows:

Anal. Calcd. for "CPNB" or $C_{10}H_8Cl_6O_3NP$: N, 3.23%, P, 7.14%. Found: N, 3.11%; P, 7.28%.

EXAMPLE V

Synthesis of 2-Diethoxyphosphono-2-Cyano-1,4,5,6,7,7-Hexachloro-5-Norbornene

The compound prepared in this example will be hereinafter referred to as "DEPNB." 2028.7 parts by weight of technical grade triethyl phosphite was added dropwise with mechanical stirring and under a stream of nitrogen to 720 parts by weight of chloro-acetonitrile over a period of 11.5 hours at a temperature of 100° to 148°C. The mixture was heated for an additional 1 hour and 40 minutes at 150°C. During the addition and the latter mentioned heating, 615 parts by weight of ethyl chloride was evolved and condensed in two traps externally cooled with dry ice.

The reaction product was purified by distillation at reduced pressure. The third distillation fraction contained pure diethyl cyanomethanephosphonate, 1547.6 parts of a clear colorless liquid with a boiling point of 86°C/0.25 mm. Based on the third fraction the yield of diethyl cyanomethanephosphonate was 91.6% and the index of refraction was 1.4316 at 25°C (DECP).

The sample of DECP was further reacted with formaldehyde as follows. 32 parts by weight of paraformaldehyde was mixed with two parts of piperidine, 8 parts of glacial acetic acid and 316 parts of methanol. The mixture was refluxed until complete solution was attained. 142.4 parts of DECP was added to the solution and the mixture was refluxed for four hours at 70° C. Methanol was distilled from the residue at reduced pressure. The liquid residue was added to 350 parts by weight of benzene and 5.5 parts by weight of orthophosphoric acid to facilitate dehydration of the initial adduct of DECP and formaldehyde. 14 parts of water and benzene were distilled at 60 to 65° C from the residue at a reduced pressure. The liquid residue was subjected to distillation at 70° to 80° C/0.4 mm and redistilled at 72° C/0.45 mm. The yield of the distillate, pure α-diethoxy-phosphonoacrylonitrile (α-DEPAN) was 89.4 parts or 59.1% yield.

Anal. Calcd. for α-DEPAN or $C_7H_{12}O_3NP$: C, 44.45%, H, 6.35%, P, 16.40%; N, 7.40%; O, 25.40%; molecular weight, 189. Found: C, 44.17%; H, 6.52%; P, 16.68%; N, 7.43%; O, 25.20% (by difference); molecular weight, 188 (determined in benzene solution).

The product, α-DEPAN, was reacted with hexachlorocyclopentadiene ($C_5Cl_6$) according to the following equation.

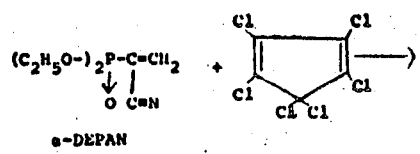

α-DEPAN

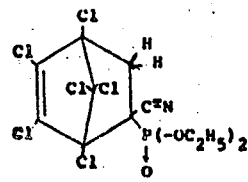

Formula VIII (DEPNB)

A mixture of 30 parts by weight of α-DEPAN or $C_7H_{12}O_3NP$, 43.3 parts of $C_5Cl_6$, 0.15 parts of tert-butylcatechol and 0.15 parts of 2,6-di-tert-butyl-4-methylphenol (the latter two compounds acting as antipolymerization agents and antioxidants) was heated in a nitrogen atmosphere for 10 hours at 35°–145°C. The resulting mixture was fractionated by distillation at a reduced pressure. $C_5Cl_6$ and α-DEPAN were obtained as the first two fractions and identified by their boiling points and infrared spectra. The last fraction contained DEPNB, a pale yellow, somewhat viscous but pourable liquid, bp 189°C/1.65 mm, which was identified by analyses and molecular weight determinations which corresponded to the calculated values for the empirical formula $C_{12}H_{12}O_3NCl_6P$. The infrared spectrum of the product showed the presence of the expected functional groups including C—Cl, cyano, phosphono (P=O or P+O), and aliphatic P—O—C ester groups. The NMR spectrum of this compound (DEPNB) indicated that more than one isomer was present.

In another preparation, equimolar amounts of α-DEPAN and of hexachlorocyclopentadiene ($C_5Cl_6$) were heated in the presence of 0.2% by weight of 2,6-di-tert-butyl-4-methylphenol at 179°–184°C for 4 hours. In this run, the amounts of unreacted starting materials present after the heating period were negligible. The products were DEPNB (structural formula VIII, or $C_{12}H_{12}O_3NCl_6P$) obtained by distillation and a black solid, a by-product obtained by taking up the residue of the distillation in petroleum ether and filtration. The black solid was virtually insoluble in petroleum ether; it melted at about 415°–425°C with gas development and decomposition to a black tar. The yield of DEPNB was better (above 50%) in the second experiment since the higher temperature facilitated the completion of the Diels-Alder reaction.

EXAMPLE VI

Preparation of 2-Methyl-2-Cyano-1,4,5,6,7,7-Hexachloro-5-Norbornene 2-methyl-2-cyano-1,4,5,6,7,7-hexachloro-5-norbornene hereinafter referred to as "MNB" was synthesized as a crystalline, white solid by heating methacrylonitrile (MAN) and hexachlorocyclopentadiene ($C_5Cl_6$).

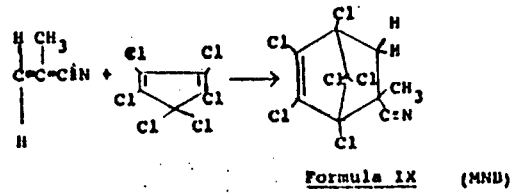

Formula IX (MNB)

2455.2 parts by weight of hexachlorocyclopentadiene ($C_5Cl_6$) was mixed with 6.1 parts by weight 2,6-ditert-butyl-4-methylphenol (an antioxidant and polymerization inhibitor) at room temperature, and the mixture was preheated in nitrogen atmosphere to 141° C. 301.9 parts by weight of methacrylonitrile (MAN) was added dropwise or in a slow stream to this mixture with mechanical agitation. The temperature of the reaction mixture was maintained at 141°–173° C. In this experiment, the molar ratio of $C_5Cl_6$ to MAN was 2:1. However, in subsequent experiments it was shown that the same compound could be prepared from equimolar amounts of $C_5Cl_6$ and MAN, without any excess of the diene.

After complete addition, the mixture was heated to 169°–174° C for 13.5 hours; thus, the total addition and heating time was 30 hours. The unreacted MAN left in the reaction mixture was insignificant since no low-boiling distillation fraction was isolated. The reaction mixture was subjected to distillation at aspirator pressure (120° C/24 mm to 126° C/18.5 mm), with the residue temperature of up to 140° C, whereupon the major part of the excess of $C_5Cl_6$ was recovered in the distillate. The distillation residue was precipitated in 3140 parts by weight of isopropyl alcohol, including the amount used for washing of the precipitated solid on the filter. The precipitated solid was filtered, washed and dried; the yield of MNB was 1175.7 parts by weight, or 76.9% yield, based on the amount of MAN used in the reaction. Crude MNB was a white solid, mp 167°–177° C.

Isopropyl alcohol was recovered by distillation from the filtrate, and the recovery was very nearly quantitative. A second fraction of recovered $C_5Cl_6$ was distilled from the residue at 96° C/5.5 mm to 126° C/2.2 mm. The total recovery of $C_5Cl_6$ of both fractions was 1227 parts, i.e., the excess of $C_5Cl_6$ used in this reaction was recovered in 100% yield. It was found that both isopropyl alcohol and hexachlorocyclopentadiene ($C_5Cl_6$) recovered by distillation were sufficiently pure to be used as the solvent and the raw material, respectively, in another preparation of MNB.

The crude MNB obtained in this experiment was of sufficient purity to be used as a fire retardant additive in amounts of about 15–25% by weight, with antimony oxide (about 2–10% by weight) as a synergistic aid for fire retardance in various resins including acrylonitrile-butadiene-styrene (ABS) resins, polystyrene, poly(styrene-acrylonitrile) or polySAN, polyethylene, polyesters, and in other polymers. White or only very faintly colored polymer blends were obtained which were found to be self-extinguishing according to the ASTM-635-D test or to the Underwriters' Laboratories' vertical fire retardance test. For example, ABS resins of such compositions containing MNB and $Sb_2O_3$ as additives were classed self-extinguishing, Group I (no dripping upon contact with flame according to the UL test No. 94). Thus, for practical purposes of industrial application as a fire retardant in polymers, recrystallization of MNB was found unnecessary. A sample was, however, recrystallized from acetone for the purpose of analytical identification of the white crystals, mp 188.5°–190.5° C to a colorless liquid (no decomposition upon melting; resolidified upon cooling to white crystals). This sample of pure MNB was analyzed as follows.

| % Elements | %C | %H | %N | %Cl | Mol. Wt. |
| --- | --- | --- | --- | --- | --- |
| Calcd. for MNB (structural formula IX) or $C_9H_5NCl_6$ | 31.80 | 1.48 | 4.12 | 62.60 | 339.9 |
| Found 1. determination | 32.45 | 1.48 | 4.40 | 61.82 | 340 (in benzene) |
| Found 2. determination | 32.30 | 1.50 | 4.28 | 61.65 | 345 (in benzene) |
| Found, average | 32.37 | 1.49 | 4.34 | 61.74 | 342.5 |

The lower-melting isomers of MNB were found to be present in smaller quantities in the final filtrate (after the precipitation of the higher-melting MNB, filtration, distillation of isopropyl alcohol and of excess $C_5Cl_6$, and repeated filtration and washing with isopropyl alcohol). The separation of higher-melting and lower-melting isomers was found to be possible because of the greater solubility of the latter in isopropyl alcohol. When the solvent was removed by repeated distillation, the residue of the final filtrate was a yellow to brownish oil containing the lower-melting isomers; the yield of the oil was 154.2 parts by weight or 10.1% (based on the theoretical yield of 1529.5 parts of the 1:1 adduct $C_9H_5NCl_6$). The analysis of the oil, which had a high boiling point at a reduced pressure, was similar to the analysis of the high-melting isomer or isomers given above. Thus, including the oil, the yield of higher-melting and lower-melting or liquid (crude) isomers of MNB was 87%.

In addition to the application in the above named and other resins, MNB was also used in amounts of 5–30% by weight as a fire retardant additive to asphalt and in paints and coatings which resulted in fire retardant and self-extinguishing compositions of matter.

Other examples of this invention are given in Table I below.

and other thermoplastic compositions may be used as the base material. The invention is defined solely by the appended claims which should be construed as broadly

TABLE I

ADDITIONAL EXAMPLES OF HALOGENATED CYANONORBORNENES OF THIS INVENTION

| Ex. No. | Structural Formula | Empirical Formula | Some Properties of This Compound | How Synthesized |
|---|---|---|---|---|
| VII | | $C_8H_2NClBr_6$ | Brown, crystalline powder; partial decomposition at 240°C, no complete melting to 400°C. | From 27 parts by weight of hexabromocyclopentadiene (yellow crystals, mp 80–82°C); 4.81 parts of alpha-chloroacrylonitrile; and 0.1 parts of 2,6-di-tert-butyl-4-methylphenol (antioxidant), by heating for 15 hours to 100–136°C and recrystallizing from xylene. |
| VIII | | $C_{10}H_8O_2NCl_5$ | Clear, viscous, pale yellow liquid, bp 108°C/0.10 mm to 111°C/0.11 mm. | From 13.2 parts by weight of 1,1-dimethoxy-2,3,4,5-tetrachlorocyclopenta-2,4-diene (a yellow liquid, $C_7H_6O_2Cl_4$, index of refraction $n_D^{20} = 1.5272$, bp 104.5–108.5°C/5 mm); 4.81 parts of alpha-chloroacrylonitrile; and 0.04 parts of 2,6-di-tert-butyl-4-methylphenol (antioxidant), by heating for 12 hours at 80–135°C and purifying the product by fractional distillation at a reduced pressure. |
| IX | | $C_{10}H_6Cl_7N$ | Yellow, viscous liquid, bp 110°C/0.07 mm to 131°C/0.1 mm. | From 316.4 parts by weight of 1-($\beta$-chloroethyl-)1,2,3,4,5-pentachlorocyclopenta-2,4-diene (a yellow liquid bp 96–102°C/0.38 mm, made from equimolar amounts of hexachlorocyclopentadiene and tri-6-chloroethyl phosphite; 91.9 parts of alpha-chloroacrylonitrile; and 0.8 parts of 2,6-di-tert-butyl-4-methylphenol, by heating for 4 hours to 130–150°C and purifying the product by fractional distillation at a reduced pressure. |
| X | | $C_8H_2NCl_5F_2$ | Yellow, viscous liquid, bp 105°C/0.1 mm to 125°C/0.2 mm. | From 24 parts by weight of 1,1-difluoro-2,3,4,5-tetrachlorocyclopenta-2,4-diene (a pale yellow liquid, $C_5Cl_4F_2$, bp 44–46°C/4 mm); 8.8 parts of alpha-chloroacrylonitrile; and 0.08 parts of 2,6-di-tert-butyl-4-methylphenol, by heating for 12 hours at 100–135°C and purifying the product by fractional distillation at a reduced pressure. |
| XI | | $C_9H_2Cl_6N_2O$ | White crystals, mp 155–160°C | By dissolving 72.1 parts by weight of "HEPT" or $C_8H_2Cl_7N$ (the product of Example I; white crystals, mp 178–180°C) and 16.3 parts of potassium cyanate in 3400°C parts of ethanol; heating the solution for 3 hours to 78°C; filtering the solution to remove the by-product (KCl) insoluble in ethanol; and concentrating the filtrate to obtain the organic product as a crystalline solid. |

The compositions of this invention have been prepared and utilized as fire retardant additives in thermoplastic polymeric compositions as illustrated in the examples above. It will be understood by those skilled in the art that the invention is not limited to the specific examples and other modifications may be made without departing from the scope of the invention. For example, other substituent groups may be placed on the norbornene molecule as defined in the introduction as is consistent with the prior art.

I claim:

1. A 2-substituted-2-cyano-norbornene compound of the formula

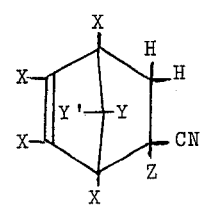

wherein X is a halogen selected from the group chlorine, fluorine and bromine, Y and Y' are independently selected from the group hydrogen chlorine, fluorine, bromine, 1 to 4 carbon alkyl and 1 to 4 carbon atom alkoxy and Z is a phosphono group of the formula

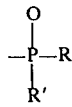

wherein R and R' are each selected from the group 1 to 4 carbon atom alkyl, and 1 to 4 carbon atom alkoxy.

2. A compound of the formula

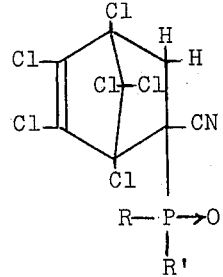

wherein R and R' are selected from the group 1 to 4 carbon atom alkyl, and 1 to 4 carbon atom alkoxy.

3. The compound of claim 2, wherein R and R' are selected from the group methoxy and ethoxy.

* * * * *